(12) United States Patent
Cohen et al.

(10) Patent No.: US 8,369,508 B2
(45) Date of Patent: Feb. 5, 2013

(54) CALL ROUTING IN TELEPHONE SWITCH BASED ON DUPLICATE LEG DETECTION

(75) Inventors: Meir S Cohen, Toms River, NJ (US); Eli Finkelman, Toms River, NJ (US)

(73) Assignee: Tel-Tech Systems, Inc., Toms River, NJ (US)

( * ) Notice: Subject to any disclaimer, the term of this patent is extended or adjusted under 35 U.S.C. 154(b) by 364 days.

(21) Appl. No.: 12/819,685

(22) Filed: Jun. 21, 2010

(65) Prior Publication Data

US 2011/0311036 A1    Dec. 22, 2011

(51) Int. Cl.
 *H04M 7/00* (2006.01)
 *H04M 3/00* (2006.01)
 *H04W 40/00* (2009.01)

(52) U.S. Cl. ............ 379/221.01; 379/265.02; 455/445

(58) Field of Classification Search .... 379/88.01–88.25, 379/142.01–142.06, 221.01–221.09, 265.02; 455/413, 445; 370/352
See application file for complete search history.

(56) References Cited

U.S. PATENT DOCUMENTS

| | | | |
|---|---|---|---|
| 4,987,587 A | | 1/1991 | Jolissaint |
| 5,504,810 A | | 4/1996 | McNair |
| 5,617,471 A | * | 4/1997 | Rogers et al. ............ 379/212.01 |
| 5,796,810 A | | 8/1998 | Lim et al. |
| 5,933,486 A | * | 8/1999 | Norby et al. ............. 379/221.09 |
| 6,031,896 A | | 2/2000 | Gardell et al. |
| 6,453,023 B1 | | 9/2002 | McKee |
| 6,680,935 B1 | | 1/2004 | Kung et al. |
| 6,996,217 B2 | | 2/2006 | Goldman |
| 7,050,563 B2 | * | 5/2006 | Dammrose ................ 379/229 |
| 7,068,772 B1 | * | 6/2006 | Widger et al. ............. 379/222 |
| 7,136,472 B2 | | 11/2006 | Hill et al. |
| 7,158,619 B2 | | 1/2007 | Simpson |
| 7,162,019 B1 | | 1/2007 | Mullis et al. |
| 7,839,995 B2 | * | 11/2010 | Batni et al. .................. 379/418 |
| 2005/0058067 A1 | | 3/2005 | Chmaytelli et al. |
| 2005/0213520 A1 | | 9/2005 | Bae et al. |
| 2006/0062364 A1 | * | 3/2006 | Crockett et al. ......... 379/114.24 |
| 2006/0142010 A1 | * | 6/2006 | Tom et al. ..................... 455/445 |
| 2006/0203990 A1 | * | 9/2006 | Cope et al. .............. 379/265.02 |
| 2010/0048180 A1 | * | 2/2010 | Sapkota et al. ............. 455/413 |
| 2010/0091963 A1 | * | 4/2010 | Frey ........................ 379/112.06 |
| 2010/0195642 A1 | * | 8/2010 | Terpstra et al. .............. 370/352 |

FOREIGN PATENT DOCUMENTS

WO    2006127255    11/2006

* cited by examiner

*Primary Examiner* — Mohammad Islam
(74) *Attorney, Agent, or Firm* — Michael J. Feigin, Esq.; Feigin & Associates, LLC

(57) ABSTRACT

The disclosed technology described herein provides devices and methods for disconnecting only the duplicate legs of a call which may have been twice or more received on a telecommunications switch for the same phone call. In embodiments of the disclosed technology, the duplicate legs indicate a twice (or more) rejected call from a called party indicating that the call should not be returned to the called party, where the called party is defined as the intended recipient of the phone call. A remaining leg or legs are kept open upon duplicate leg detection on a switch, and the call is then handled with a premium feature, such as forwarding to voicemail.

18 Claims, 5 Drawing Sheets

CALL ROUTING IN TELEPHONE SWITCH BASED ON DUPLICATE LEG DETECTION

FIELD OF THE DISCLOSED TECHNOLOGY

The disclosed technology relates generally to telephone switches and, more specifically, to customized call routing.

BACKGROUND OF THE DISCLOSED TECHNOLOGY

Telephone switches are devices which receive an incoming call on a first leg and route the call out to another device or part of the switch over another leg. In a well known legend in the world of hacking telephone switches, legend has it that John Draper (a.k.a. Captain Crunch) once hacked telephone switch after telephone switch, passing his phone call from one to another. At no charge, he routed a call through different phone switches in countries such as Japan, Russia and England and connected the call, after it went around the world, back to a phone sitting next to him in California, United States. The story continues that, after a few minutes, the phone next to him rang and he heard his own voice, though full of echoes and with a few seconds' delay. Legend further has it that Draper contacted former U.S. President Richard Nixon in this manner.

The above story, even if not true, and although about thirty years old, is a fairly accurate portrayal of one of the problems with telephone systems even today. In automated systems, a phone call can be passed back and forth between different communication legs directly to each other, or by way of other switches in between. This results in a waste of resources (multiple legs on the same switch may be open for what is actually a single phone call) and causes a degradation in call quality (either due to latency or loss of analog or digital data through multiple rebroadcasts).

Unfortunately, given the wide array of telecommunications equipment in place around the world, as well as various government regulations and privacy concerns, implementing any new method of tracking a phone call between switches would be exceedingly difficult. Current technology for tracking calls also has limitations. Automatic Number Identification codes (ANI codes) may change and CallerID codes may be unavailable or unreliable. However, such tracking would be very useful to detect and monitor calls such as the above-described call to Richard Nixon. What is needed is an inexpensive to implement method, using current phone technology, to track phone calls and route them in a more efficient manner to avoid wasting telecommunications resources and to counter abuse.

SUMMARY OF THE DISCLOSED TECHNOLOGY

The disclosed technology described herein addresses a need, unfulfilled in the prior art, by detecting duplicate legs, disconnecting only the duplicate legs, and handling the single remaining leg based on the fact that the duplicate leg or legs were disconnected.

In an embodiment of the above, this is accomplished by routing calls as follows. At a telecommunications switch, a forwarded call leg is received from a called party from a second telecommunications switch. After receiving a call, it is compared to at least one phone number associated with a party to the forwarded call (either the calling party or the party intended to be called). Further, a time of the receiving of the forwarded call leg is recorded or compared to attributes of other active legs on the telecommunications switch. Based on comparisons of time and parties to the phone call, an active leg, which is a prior connected leg of the forwarded call leg, is detected. As a result, a disconnect signal is sent to the second telecommunications switch. When this disconnect signal reaches back to the prior connected leg on the (first) telecommunications switch, the disconnect signal is ignored (meaning that a disconnect is not carried out as a proximate result of the disconnect signal), and a premium feature is applied to the forwarded call.

The disconnect signal, in embodiments of the disclosed technology, disconnects a toll-free leg and maintains the call at the prior connected leg. Such a phone call may be initiated by a calling party to the called party and the phone number associated with a party is a phone number associated with the calling party.

The attributes of the other active legs used above may include call time, a phone number of a party to the forwarded call (calling party or intended called party, a.k.a. "called party"), and another active leg may be a leg comprising attributes such as being directed to a phone number of a party which is equal to the phone number to which the call was forwarded in the first and/or second instances. The phone numbers of a party to the forwarded call may be a phone number of the called party.

The selecting may be limited to selecting of calls received prior to receiving the forwarded call leg and no longer than thirty seconds prior to receiving the forwarded call leg (the second time forwarded, as described above).

The premium feature employed after detecting a duplicate leg and disconnecting the duplicate leg may be voicemail, caller ID unmasking, call recording, or other features.

Prior to the step of receiving, the phone call may have previously been rejected by the (intended) called party and forwarded to the telecommunications switch, where the telecommunications switch applied a premium feature and forwarded the call back to the called party. It is, then, after a second rejection or non-answering of the phone call, that the call is forwarded to the telecommunications switch in the step of receiving.

In another embodiment of the disclosed technology, a telecommunications switch has an input configured to receive a leg of a forwarded call from a called party by way of a second telecommunications switch. Upon such receiving, the first switch is configured to carry out instructions to compare at least one phone number associated with a party to the forwarded call and a time of the receiving of the leg of the forwarded call, to attributes of other active legs on the telecommunications switch. It is further configured to select, based on the comparing, another of the active legs which is a previously connected leg of the leg of the forwarded call. Upon such a selection being made, a disconnect signal is sent to the second telecommunications switch which is propagated down the communications legs; however, such a disconnect signal is ignored for the prior connected leg (meaning that a disconnect is not carried out as a proximate cause of receiving the disconnect signal), and instead, a premium feature is applied to the forwarded call upon receiving the disconnect signal. This premium feature may be voicemail, and the other features described above with respect to the method of call routing may be similarly applied to the telecommunications switch described herein.

DETAILED DESCRIPTION OF EMBODIMENTS OF THE DISCLOSED TECHNOLOGY

The disclosed technology described herein provides devices and methods for disconnecting only the duplicate legs of a call which is twice, or more frequently, received on a telecommunications switch for the same phone call (a phone call being defined as the communication from a calling party intended to reach a called party in a single instance, including communication to switches and routers positioned between the calling party and the called party in the network topology). In embodiments of the disclosed technology, the duplicate legs indicate a twice (or more) rejected call from a called party, indicating that the call should not be returned to the called party, where the called party is defined as the intended recipient of the phone call. A remaining leg or legs are kept open upon duplicate leg detection on a switch and the call is then handed with a premium feature, such as forwarding to voicemail.

In an embodiment of the above, this is accomplished by routing calls as follows. At a telecommunications switch, a forwarded call leg is received by a called party from a second telecommunications switch. After receipt of a call, it is compared to at least one phone number associated with a party to the forwarded call (either the calling party or intended called party). Further, a time of the receiving of the forwarded call leg is recorded or compared to attributes of other active legs on the telecommunications switch. Based on comparisons of time and parties to the phone call, one of the active legs, which is a previously connected leg of the forwarded call leg, is detected. As a result, a disconnect signal is sent to the second telecommunications switch. When this disconnect signal reaches back to the previously connected leg on the (first) telecommunications switch, the disconnect signal is ignored (meaning that a disconnect is not carried out as a proximate result of the disconnect signal), and a premium feature is applied to the forwarded call.

Embodiments of the disclosed technology are described below, with reference to the figures provided.

Figure 1:
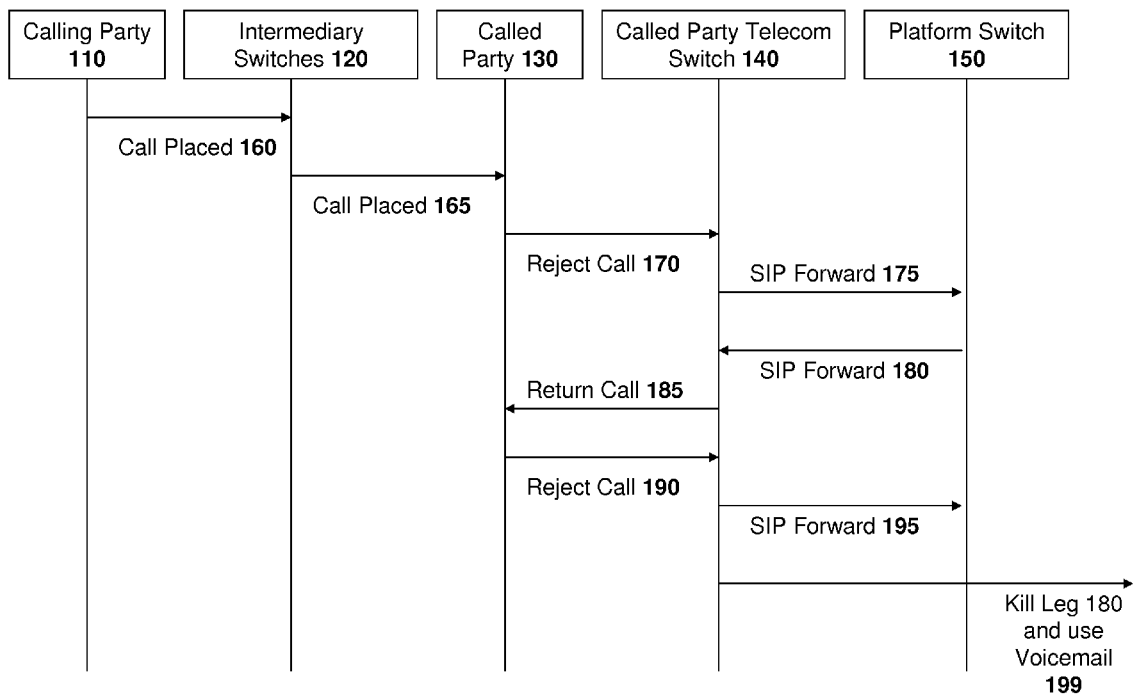
FIG. 1 shows a diagram of a method of routing a call over multiple switches in embodiments of the disclosed technology.

FIG. 1 shows a diagram of a method of routing a call over multiple switches in embodiments of the disclosed technology. A calling party 110, defined as a person or device that initiates a phone call over a telephone network (a plain old telephone service network, voice over internet protocol network, combination thereof, or other) places a call 160. This call first hits an intermediary switch 120, which may be operated by the telecom provider of the calling party and/or may comprise a plurality of switches between the calling party 110 and called party 130. The call is placed 165, via a further leg or further legs (communications channels between two switches or a switch and a party to the phone call) between the intermediary switch 120 and the called party 130. The called party 130 is the desired target of the calling party 110 (or may be a new target designated by the called party 130, such as by way of call forwarding or the like).

In embodiments of the disclosed technology, the called party 130 rejects the call in step 170. On a cellular phone, the difference between rejecting a call and not answering may be delineated, whereby different codes are propagated from the cellular phone of the called party 130 to a cellular network provider. When not answered, for example, the call may be forwarded to voicemail. When rejected (such as by hitting a "reject" or "silence" button on the cellular phone), the reject call leg 170 is opened between the called party 130 and a telecom switch 140 associated with the called party. In this embodiment, the called party's telecom switch 140 forwards the call via a SIP forward 175 to platform switch 150. The Session Initiation Protocol (SIP) is an IETF-defined signaling protocol, widely used for controlling multimedia communication sessions, such as voice and video calls over Internet Protocol (IP). The protocol can be used for creating, modifying and terminating two-party (unicast) or multiparty (multicast) sessions consisting of one or several media streams. Other feasible application examples include video conferencing, streaming multimedia distribution, instant messaging, presence information, file transfer and online games. While SIP is used in this embodiment, other embodiments may use any forwarding technique known in the art to send a phone call to another leg or platform within a telecommunications network.

Still referring to FIG. 1, the Platform Switch 150 may perform any of the premium functions described above and may modify the phone call (change ANI or CallerID data, change the sound of the phone call, add multimedia content, provide phone recording services, provide voicemail with calling party 130 listening ability, etc.) before forwarding the call back to the called party's telecom switch 140 via a SIP forward 180. At this point, the call is now open among each of the calling party 110, intermediary switches 120, called party 130, called party telecom switch 140, and platform switch 150. Call data passes through each of these parties/switches and may be disconnected or modified by one or more of the switches.

At this point, the call is then returned further back "up the line," that is, back to the called party 130 via a return call 185. The called party 130 is then run again with the phone call (that is, another leg to the called party is opened), though this time the data may have been modified. For example, the CallerID data may be modified to indicate that a service of the platform switch 150 is now activated, or the like. Or, CallerID data may be provided which was previously unavailable when the call first reached the called party via leg 165.

The called party 130 may now decide to accept the call, and the calling party 110 and called party are then connected by way of the three switches (or groups thereof) 120, 140, and 150. However, if the called party 130 again decides to reject the call, reject call leg 190 is opened to the called party's telecom switch 140, which then, again, forwards the call to the platform switch 150, but this time, via leg 195 which may be a SIP forward or other call forwarding known in the art.

A problem arises in that the platform switch 150 cannot "automatically" recognize that this new call is the same as the one currently open in instances forwarded from the SIP forward legs 175 and 195. Thus, the call would bounce back and forth between called party 130 and platform switch 150, tying up many legs, degrading quality (potentially), wasting resources, and ringing the called party 130 until the system crashes or the called party picks up the line and hangs up. Before explaining the solution in embodiments of the disclosed technology (which results in leg 180 being cancelled and the call being forwarded to voicemail 199), another embodiment shown and described with respect to FIG. 2, will be discussed.

Figure 2:
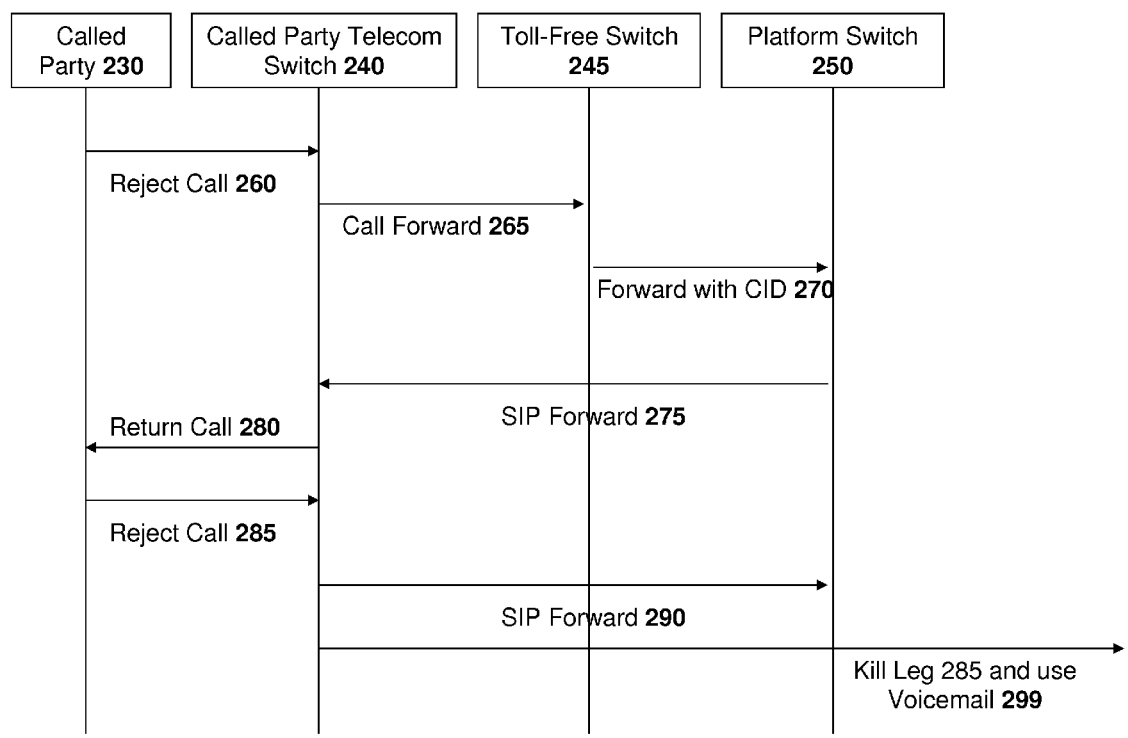
FIG. 2 shows a diagram of a method of routing a call similar to that of FIG. 1, while using a toll-free switch in embodiments of the disclosed technology.

FIG. 2 shows a diagram of a method of routing a call similar to that of FIG. 1, while using a toll-free switch in embodiments of the disclosed technology. In FIG. 2, the switches and parties have been incremented by 100 compared to FIG. 1, and, for simplicity, the Calling Party and Intermediary Switch have been removed from the drawing, though the network paths/legs of FIG. 1 in this respect, may be applied to FIG. 2.

The Called Party 230 receives a call and rejects it, causing a rejected call leg 260 to send the call to the called party's telecommunications switch 240. In this case, the caller ID information is blocked or believed to be unreliable, and so the called party telecom switch 240 forwards the call via call forward leg 265 to a toll-free switch 245. The toll-free switch 245 may be operated by, or be, a separate telecommunications company or switch. The toll-free switch 245 has the ability to read ANI data (automatic number identification, an inward-WATS telephone service, where WATS is "Wide Area Telephone Service" or other call data associated with the call. In the United States, these are known as 888, 877, and 866 numbers, and the system/terminology is similar in Australia. In Europe, ANI service may be known as CLI (calling line identification), and in the U.K., it is CLID (caller line identification).

In another embodiment of the disclosed technology, a call forwarding leg connects the called party telecom switch 240 to the platform switch 250, and the platform switch 250 first forwards the call to the toll-free switch 245, receives the call back with callerID data (or ANI data provided in any other manner), and then passes it back to the called party telecom switch 240. In this manner, the platform switch 250 may later disconnect the call to the toll-free switch before forwarding to voicemail 299, as will become apparent when reading the detailed description pertaining to FIG. 3.

The toll-free switch 245 then forwards the call along leg 270 to a platform switch 250, the platform having been described above with reference to FIG. 1. In this case, the ANI (or similar data) which was masked is now forwarded as CallerID data (or any other form of unmasked data relaying information about the calling party). Via a SIP forward 275 or other forwarding mechanism, the call is returned to the called party's telecom switch 240, and the call is returned in leg 280 to the called party. Thus, this is the second time the call reaches the called party 230, who is the intended recipient of the call, or a device associated with the intended recipient, or a device associated with a phone number where the intended recipient directed the call. In some cases, at this second instance, the CallerID information, which was previously not provided, is now provided to the called party 230.

If the Called Party 230 again rejects the call, this opens up reject call leg 285 to the called party's telecommunications switch 240, where it is forwarded to the platform switch 250. It may then go to voicemail 299 when it is detected that the call has been rejected a second time (as will be discussed with reference to FIG. 3); however, this is expensive, not only in resources, but because a toll-free leg is open and the recipient must pay the toll-free charges. As this may very well be a telemarketing or other undesired call, a recipient may not want to pay the charges when the call is forwarded to voicemail 299. Thus, it is desirable, and is carried out in embodiments of the disclosed technology, to kill leg 265 (thus, closing all downward legs 270, 275, 280, 285, and 290) and forward the call from the called party telecommunications switch 240 to voicemail 299.

Figure 3:
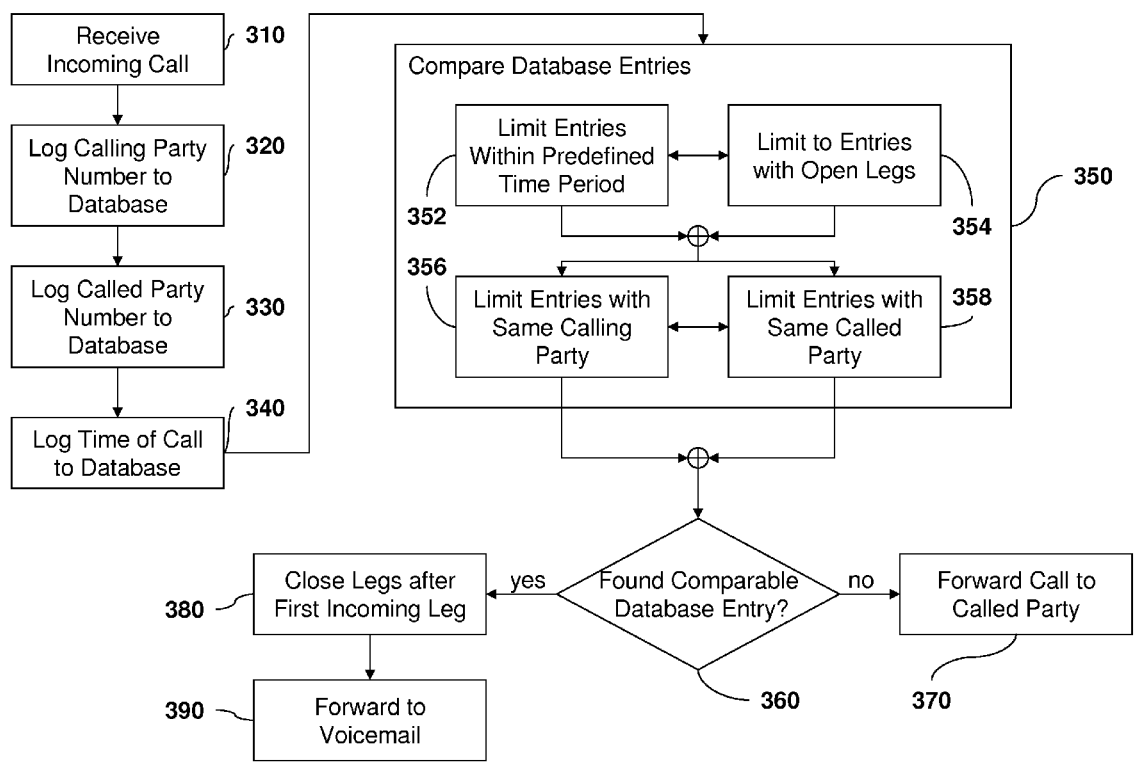
FIG. 3 shows steps carried out to determine if a call leg is a duplicate leg and to route the call based on that determination, in embodiments of the disclosed technology.

FIG. 3 shows steps carried out to determine if a call leg is a duplicate leg and to route the call based on that determination, in embodiments of the disclosed technology. In step 310, an incoming call is received to a switch. In embodiments, this is the platform switch 150 or 250 of FIGS. 1 and 2, but may be any switch described in the prior Figures, or a telecommunications switch known in the art. Such a switch routes calls and makes routing decisions. The calling party's number is logged to a database in step 320. The caller party's number may be received in the form of CallerID, ANI, or other information, or may be unavailable, in which case, the unavailability may be logged. In step 330, the called party's number is logged to the database. Such data may be associated with or transmitted by another switch to a called party's switch and/or to a platform switch. The time of the call (when received) or time of this logging is also logged to the database in step 340.

In step 350, the database entry added in steps 320, 330, and 340 is compared to previous database entries. Entries are selected based on one entry or both entries made within a predefined time period 352 and/or entries with open logs 354 (that is, where the call is still open on the switch). Thus, the compared entries are limited, based on active connections and those made within a certain period of time. The reason for the limit 354 is that, if a call has already been closed, it is apparent that the current call is a new one and has only reached the switch (e.g., been rejected or gone unanswered by the called party) one time thus far. If it is an open call, a time factor (step 352) becomes significant.

It is possible that two different calling parties and two different called parties' share the same calling and called numbers. Where the calling party's number is unavailable (e.g., blocked callerID and a toll-free switch has not been used), then only the called party's number is available so it is important not to improperly disconnect a phone call on the switch which is actually from a different calling party. Thus, such errors are limited by predefining a time period in step 352. The time for two forwards back and forth between a called party (such as 130 or 230 of FIGS. 1 and 2, respectively) and a platform switch (such as 150 or 250 of FIGS. 1 and 2, respectively) is estimated, and the maximum estimated time may be used in step 352. To err on the side of caution, that is, potentially allow more double or triple forwarding and fewer improperly dropped calls, a shorter time period may be used. Such time periods may be set at 5, 10, 15, 20, 25, 30, 35, 40, 45, 50, 55, or 60 seconds. Generally speaking, after 60 seconds, it is assumed that another incoming call 310 with the same calling party and/or called party data is actually a different call which should not be disconnected based on the currently active call. In case of error, that is a call continues to be forwarded back to a called party, many calls will likely reach the switch in quick succession as the called party keeps trying to reject the call. These multiple calls in a short span of time, such as every 10 seconds, with the same or similar associated data (e.g., unavailable calling party data) will indicate that they are all, in fact, comparable database entries.

In step 356, as partially described in the preceding paragraph, entries with the same calling party identification (such as a phone number or unavailable status) and/or entries with the same called party identification are selected. If this selection results in more than one entry, the closest entry in time may be selected, the best match may be selected, or all entries may be selected. If the calling party data is unavailable in the matching entries, the time threshold of step 352 may be lessened, as the chance of error is increased. Then, in step 360, if a comparable database entry or entries is/are found (limited by the steps described above), then step 380 is carried out. The legs pertaining to the first time the call reached the switch are closed. In embodiments of the disclosed technology, this may allow closure back to the telecommunications switch associated to the called party or closure back to the first instance of the receipt by the platform switch. This allows, for example, a leg to and from a toll-free provider to be closed, while maintaining the connection and minimizing toll-free charges. Still further, this allows for the removal of duplicate resources and, even further, the detection of how many times the same call has been received by (or attempted to be sent to) the called party.

Referring again to FIGS. 1 and 2 in light of the steps described with reference to FIG. 3, when a comparable database entry is found in step 360, and the legs after the first incoming leg are closed in step 380, the functions on the switches are as follows. Using the numbering system of FIG. 2, after the second SIP forward 290 to the platform switch 250, a SIP signal 483 ("too many hops") or other code known in the art, or another communications signal (e.g., busy signal) is transmitted by the platform switch. Such a signal or other code in the art serves as a disconnect signal, causing at least some of the legs of the communication for the phone call to be disconnected. In FIG. 2, this causes the SIP forward leg 290 between switch 240 and 250, the reject call leg 285, and the return call 280 leg all to close. This leaves open, in the example of FIG. 2, legs 260, 265, and 270. In other embodiments of the disclosed technology, the platform switch 250 is reached before the toll-free switch 245, and then the toll-free switch 245 is reached by a separate leg back and forth thereto. In this manner, such a leg is closed, too, and further toll-free charges are avoided. In either case, once the busy signal, SIP signal 483, or other such signal reaches back to the first leg on the platform switch 250, which may take less than a second, it is re-interpreted as a duplicate call leg returning to the first leg, and treated accordingly. For example, in FIG. 2, it is forwarded to voicemail via a leg 299.

If a comparable database entry in step 360 has not been found, based on the parameters described above, then it is assumed or detected that the called party has only received the call once. As such, it is then forwarded back to the called party a second time (such as with unmasked or provided CallerID data or another premium/multimedia service, such as phone recording or live voicemail (comprising call recording). where the called party can listen as the caller leaves voicemail). If, at this stage, the called party again rejects the call, this entry is in the database and steps of FIG. 3 are carried out a second time. This time, however, it should be detected as a second iterancy, and thus, a comparable database entry should be found in step 360, leading to steps 380 and 390 being carried out.

Figure 4:
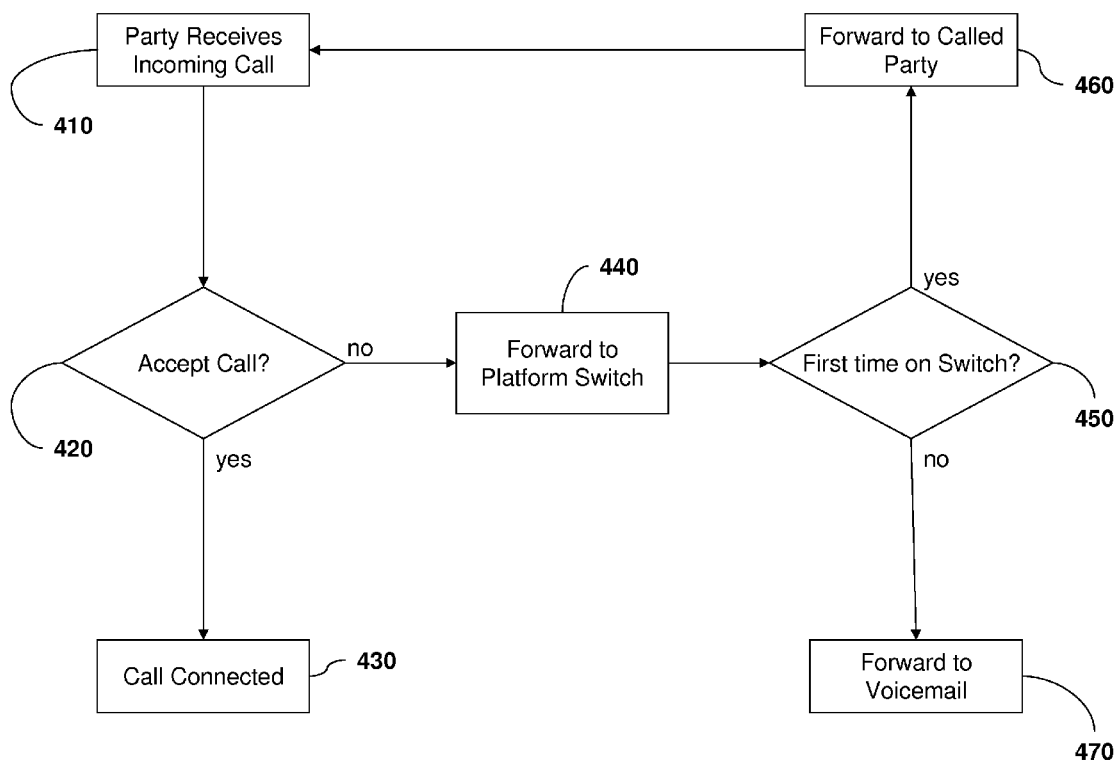
FIG. 4 shows steps of a high level block diagram of a call forwarding method of embodiments of the disclosed technology.

FIG. 4 shows a high level block diagram of a call forwarding method of embodiments of the disclosed technology. In step 410, a party receives an incoming call. This is a called party, such as a called party 130 or 230 of FIGS. 1 and 2. The called party then decides, in step 420, whether to accept the call. For example, if there is no caller ID information or it is from an unwanted party, or simply because the called party does not answer the call in time, in step 440, the call is forwarded to a platform switch. The platform switch may be a switch 150 or 250, such as described above with reference to FIGS. 1 and 2.

Though a platform switch is described in FIG. 4, any switch may be used, that is, any piece of telephone equipment which makes routing decisions. A platform switch, however, as described above, may provide other premium features, such as phone call recording, live voicemail, voice modification (to the caller or party being called (called party)), unmasking blocked callerID information (ANI→CallerID conversion by way of Inward WATS forwarding) and so forth. In embodiments of the disclosed technology, such features are only provided if the called party, in step 420, rejects the call with a "reject" button, as opposed to simply not answering the call. In this manner, the reject button, such as on a cellular phone, sends a different signal to the telecom provider and/or platform switch than if the call were just left unanswered, and as such, the services of the switch are provided only when the call is rejected.

In step 450, it is determined whether this is the first time the call has reached the switch. This may be determined by the methods described with reference to FIG. 3 or manually, such as by an operator watching incoming calls, or the like. If this is the first time this particular call has reached the switch, then step 460 is carried out whereby the call is forwarded back to the called party (such as after adding the features or a feature described in the preceding paragraph) and the called party again receives an incoming call. In this case, the callerID may be modified, or a text message (e.g., SMS, simple message syndication) sent to the called party to indicate that this is the second time the call is being sent to the called party. In some cases, the callerID will comprise a phone number or other identification of the calling party which was previously unavailable. If the called party accepts the call, then the call is connected in step 430. If not, the call is again forwarded to a platform switch in step 440. It should be understood that the forwarding to a platform switch in step 440 may be by way of other switches and telecom providers, such as described in the previous figures, but that only the platform switch is listed in FIG. 4 for the sake of simplicity and not limitation. This time, however, in step 450 it will be determined that this is the second time the call has reached the switch, and as such, in step 470, the call will be forwarded to voicemail. Voicemail is one example of how to handle a twice-received call. Other examples include forwarding to another phone number, dropping the call, playing a recorded message to the caller, and/or sending a notification by e-mail or SMS with call information.

Figure 5:
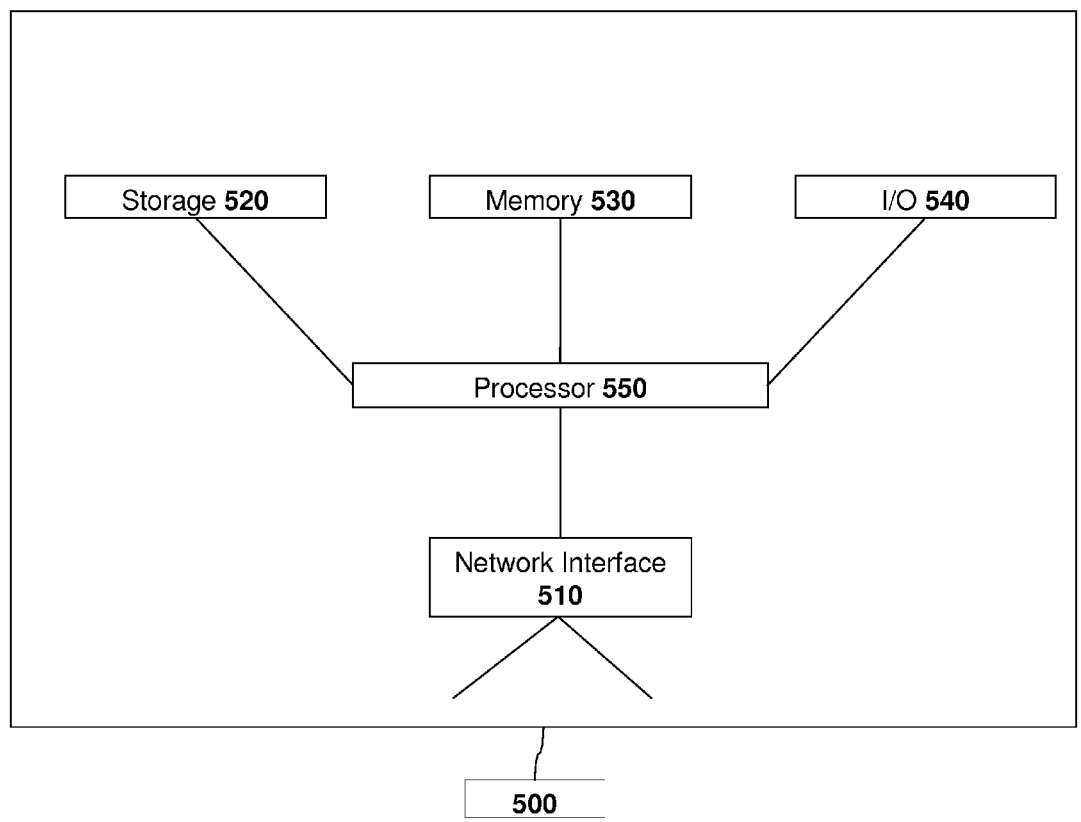
FIG. 5 shows a high-level block diagram of a device that may be used to carry out the disclosed technology.

FIG. 5 shows a high-level block diagram of a device that may be used to carry out the disclosed technology. Device 500 comprises a processor 550 that controls the overall operation of the computer by executing the device's program instructions which define such operation. The device's program instructions may be stored in a storage device 520 (e.g., magnetic disk, database) and loaded into memory 530 when execution of the console's program instructions is desired. Thus, the device's operation will be defined by the device's program instructions stored in memory 530 and/or storage 520, and the console will be controlled by processor 550 executing the console's program instructions. A device 500 also includes one or a plurality of input network interfaces for communicating with other devices via a network (e.g., the internet). The device 500 further includes an electrical input interface. A device 500 also includes one or more output network interfaces 510 for communicating with other devices. Device 500 also includes input/output 540 representing devices which allow for user interaction with a computer (e.g., display, keyboard, mouse, speakers, buttons, etc.). One skilled in the art will recognize that an implementation of an actual device will contain other components as well, and that FIG. 6 is a high level representation of some of the components of such a device for illustrative purposes. It should also be understood by one skilled in the art that the method and devices depicted in FIGS. 1 through 4 may be implemented on a device such as is shown in FIG. 5.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

We claim:

1. Call routing based on duplicate leg detection, comprising:
    receiving, at a telecommunications switch, a forwarded call leg of a phone call from a called party via a second telecommunications switch;
    comparing at least one phone number associated with a party to said forwarded call and a time of said receiving of said forwarded call leg, to attributes of other active legs on said telecommunications switch;
    selecting, based on said comparing, another active leg of said active legs which is a prior connected leg of said forwarded call leg;
    sending a disconnect signal to said second telecommunications switch;
    ignoring said disconnect signal for said prior connected leg; and
    applying a premium feature to said forwarded call leg;
    wherein a phone call was rejected by said called party and forwarded to said telecommunications switch and said telecommunications switch applied a premium feature and forwarded said call back to said called party, before said step of receiving.

2. The call routing of claim 1, wherein said disconnect signal disconnects a toll-free leg and maintains said forwarded call leg at said prior connected leg.

3. The call routing of claim 2, wherein a phone call of said phone call is initiated by a calling party to said called party and said phone number associated with a party is a phone number associated with said calling party.

4. The call routing of claim 1, wherein said attributes of said other active legs comprise call time, a phone number of a party to said forwarded call, and said another active leg is a leg comprising a said phone number of a party which is equal to the phone number of said forwarded call.

5. The call routing of claim 4, wherein said phone number of a party of said forwarded call is a phone number of a said called party.

6. The call routing of claim 5, wherein said selecting is limited to calls received from said called party prior to receiving said forwarded call leg and no greater than thirty seconds prior.

7. The call routing of claim 1, wherein said premium feature is voicemail.

8. The call routing of claim 1, wherein said applied premium feature was caller identification (CallerID) unmasking.

9. The call routing of claim 1, wherein said applied premium feature comprised call recording.

10. A telecommunications switch:
    comprising an input configured to receive a leg of a forwarded call from a called party by way of a second telecommunications switch;
    configured to carry out instructions to compare at least one phone number associated with a party to said forwarded call and a time of said receiving of said leg of said forwarded call, to attributes of other active legs on said telecommunications switch;
    configured to select, based on said comparing, another active leg of said active legs which is a prior connected leg of said leg of said forwarded call;
    configured to send a disconnect signal to said second telecommunications switch;
    configured to ignore said disconnect signal for said prior connected leg; and
    apply a premium feature to said forwarded call;
    wherein said telecommunications switch is further configured to carry out said instructions after a phone call was rejected by said called party and forwarded to said telecommunications switch and said telecommunications switch applied a premium feature and forwarded said call back to said called party.

11. The telecommunications switch of claim 10, wherein said disconnect signal disconnects a toll-free leg and maintains said forwarded call at said prior connected leg.

12. The telecommunications switch of claim 11, wherein said forwarded call is initiated by a calling party to said called party and said phone number associated with a party is a phone number associated with said calling party.

13. The telecommunications switch of claim 10, wherein said attributes of said other active legs comprise call time, a phone number of a party of said forwarded call, and said another active leg is a leg comprising a said phone number of a party which is equal to said phone number of said forwarded call.

14. The telecommunications switch of claim 13, wherein said phone numbers of a party to said forwarded call is a phone number of said called party.

15. The telecommunications switch of claim 14, wherein said configuration to select is limited to calls received prior to receiving said forwarded call leg and no greater than thirty seconds prior.

16. The telecommunications switch of claim 10, wherein said premium feature is voicemail.

17. The telecommunications switch of claim 10, wherein said applied premium feature was caller identification (CallerID) unmasking.

18. The telecommunications switch of claim 10, wherein said applied premium feature comprised call recording.

* * * * *